United States Patent Office 3,347,834
Patented Oct. 17, 1967

3,347,834
POLYMERS CONTAINING A MULTIPLICITY OF SULFINO OR DITHIOCARBOXY GROUPS, AND METHODS OF PREPARATION
Floyd E. Naylor, Bartlesville, Okla., assignor to Phillips Petroleum Company, a corporation of Delaware
No Drawing. Filed Nov. 18, 1964, Ser. No. 412,228
14 Claims. (Cl. 260—79.3)

This invention relates to polymers having a plurality of sulfino and/or dithiocarboxy groups and methods of preparing such polymers.

It is an object of the invention to provide new and useful polymeric materials. Another object of the invention is to provide simple and economical processes for preparing polymeric material containing a plurality of sulfino and/or dithiocarboxy groups. Yet another object of the invention is to provide novel acidic polymers. Other aspects, objects and advantages of the invention will be apparent from a study of the disclosure, the drawings and the appended claims.

It has now been found that polymers containing aliphatic double bonds can be readily converted to a polymer containing a multiplicity of sulfino and/or dithiocarboxy groups by treating the polymer first with an organometal hydride and then with sulfur dioxide and/or carbon disulfide. The metal sulfinate structures formed upon introduction of sulfur dioxide are converted to —$SO_2H$ groups by treatment with a mineral acid or other suitable reagent. Similiarly, the metal dithiocarboxy structures formed upon introduction of carbon disulfide are converted to —CSSH groups by treatment with a mineral acid or other suitable reagent. Products prepared by this process are acidic by virtue of the highly acidic nature of the sulfino and/or dithiocarboxy substitutents.

The polymers which can be treated in accordance with the invention include any polymer which contains aliphatic double bonds in the polymer chain. Suitable polymers include homopolymers of acyclic alkadienes acyclic alkatrienes, cyclic alkadienes and cyclic alkatrienes, in which the double bonds can be in either conjugated or non-conjugated arrangement, and copolymers of these monomers with each other or with one or more mono-1-olefins, for example styrene, alkyl substituted styrenes, vinylnaphthalenes, ethylene, propylene, 1-butene, 1-hexene, 1-octene, 1-nonene, isobutylene, 2-methyl-1-hexene, and the like. Examples of suitable alkadiene and alkatriene monomers include 1,3-butadiene, isoprene, 2,3-dimethyl-1,3-butadiene, 2-methoxy-1,3-butadiene, 2-phenyl-13-butadiene, 1,5-hexadiene, 1,4-pentadiene 1,6-heptadiene, 2-ethyl-1,5-hexadiene, 1,4,7-octatriene, 1,3-pentadiene, 1,3,7-octatriene, 1,3-cyclohexadiene, cyclopentadiene, 1,3,7-cyclooctadiene, 1,3-dicyclopentadiene, and the like. The polymer can be prepared by any known methods desired.

The treating process of the invention is generally conducted in the presence of an inert diluent, for example a saturated aliphatic, saturated cycloaliphatic or aromatic hydrocarbon having from 3 to 10 carbons per molecule, including pentane, propane, hexane, cyclohexane, methylcyclohexane, nonane, decane, toluene, xylene ethylbenzene and the like. Mixtures of any of these diluents can be employed. A conventional method of operation is to prepare the polymer in a hydrocarbon diluent and utilize the polymerization reaction mixture, either prior or subsequent to inactivation of the catalyst, for treatment with the organometal hydride.

The organometal hydrides which can be employed as treating agents in accordance with the invention can be represented by the formula $R_xMH_y$ where R is a saturated aliphatic, a saturated cycloaliphatic, or an aromatic radical, and combinations thereof such aliphaticarmatic, aromaticaliphatic, etc., containing from 1 to 20 carbon atoms per molecule, M is a metal selected from the group consisting of aluminum, gallium, indium and thallium, H is hydrogen, x and y are integers selected from the group consisting of 1 and 2 and the sum of x and y equals the valence of the metal. Representative organometal hydrides coming within the scope of the general formula include methylaluminum dihydride, dimethylaluminum hydride, ethylaluminum dihydride, diethylaluminum hydride, propylaluminum dihydride, n-butylaluminum dihydride, diisobutylaluminum hydride, n-hexylaluminum dihydride, dioctylaluminum hydride, cyclopentylaluminum dihydride, decylaluminum dihydride, tetradecylaluminum dihydride, heptadecylaluminum dihydride, di(octadecyl) aluminum hydride, eicosylaluminum dihydride, cyclohexylaluminum dihydride, cycloheptyaluminum dihydride, dicyclodecylaluminum hydride, cyclodecylaluminum dihydride, cycloeicosylaluminum dihydride, cyclooctylaluminum dihydride, phenylaluminum dihydride, diphenylaluminum hydride, 1-naphthylaluminum dihydride, biphenylaluminum dihydride, o-tolylalauminum dihydride, 1,3,4,5-tetramethylphanylaluminum dihydride, methylgallium dihydride, dimethylgallium hydride, diethylgallium hydride, ethylgallium dihydride, propylgallium dihydride, isobutylgallium dihydride, di-n-butylgallium hydride, di-n-hexylgallium hydride, octylgallium dihydride, decylgallium dihydride, di(tetradecyl)gallium hydride, heptadecylgallium dihydride, dieicosylgallium hydride, octadecylgallium dihydride, dicyclopentylgallium hydride, dicyclohexylgallium hydride, cyclodecylgallium dihydride, (2,6-dipropyl-4-octyl)cyclohexylgallium dihydride, phenylgallium dihydride, naphthylgallium dihydride, methylindium dihydride, dimethylindium hydride, ethylindium dihydride, diethylindium hydride, n-butylindium dihydride, dihexylindium hydride, decylindium dihydride, diheptylindium hydride, dieicosylindium hydride, dicyclohexylindium hydride, cyclohexylindium dihydride, cyclodecylindium dihydride, 5,8-dibutyldodecylindium dihydride, phenylindium dihydride, naphthylindium dihydride, 1,2,3,4-tetramethylphenylindium dihydride, methylthallium dihydride, dimethylthallium hydride, ethylthallium dihydride, diethylthallium hydride, dihexylthallium hydride, decylthallium dihydride, tetradecylthallium dihydride, eicosylthallium dihydride, dicyclopentylthallium hydride, dicyclohexylthallium hydride, cyclodecylthallium dihydride, 4,8-diphenyloctylthallium dihydride, phenylthallium dihydride, diphenylthallium hydride, naphthylthallium dihydride, and the like. The organometal hydrides where R has from 1 to 10 carbon atoms per molecule are presently preferred.

The amount of the organometal hydride utilized in the present process can vary over a wide range depending upon the particular polymer and hydride used as well as the desired characteristics of the final material. In general the amount of the organometal hydride will be in the range of 1 to 200 millimoles, preferably 5 to 150 millimoles, per 100 grams of polymer to be treated. Larger or smaller quantities of the organometal hydride can be employed if desired.

The organometal hydride can be added alone or as a solution or dispersion in a hydrocarbon such as that employed as the polymerization diluent. The reaction of the polymer with the organometal hydride can be carried out at suitable temperatures, generally in the range of 40° F. to 300° F., with temperatures in the range of 75° F. to 200° F. being preferred in order to minimize any decomposition of the reactants and obtain a high reaction rate. The reactants can be agitated to facilitate contact. Reaction time will be dependent upon the temperature and the particular organometal hydride and polymer employed. The reaction time will usually be in the range of 1 minute to 15 days, and is preferably in the range of 5 minutes to 30 hours to minimize equipment tieup. After reaction of the polymer with the organometal hydride, an excess, with respect to the organometal hydride, of sulfur dioxide and/or carbon disulfide is introduced. The resulting mixture can be agitated during the treating period to facilitate contact of reactions and increase the reaction rate. The temperature during this step will generally be the same as used for the polymer-organometal hydride reaction, i.e., in the range of 40° F. to 300° F., and preferably in the range of 75° F. to 200° F. Satisfactory results can usually be obtained in a period ranging from a few seconds to 30 minutes, depending upon the temperature, since the reaction is quite rapid. After the desired extent of reaction of the sulfur dioxide and/or carbon disulfide with the organometal hydride treated polymer has been accomplished, an acidifying agent is introduced into the reaction mixture. Suitable acidifying agents include mineral acids, for example, hydrochloric acid, nitric acid, sulfuric acid and the like, and organic acids, for example, acetic acid, propionic acid and the like. The acidifying agent is added in an amount in excess of the organometal hydride. The acidified polymer can be subjected to any suitable known process for recovering and/or further processing of the polymer product.

While the invention is not limited to any particular reaction mechanism theory it is believed that the organometal hydride reacts with the double bond in the polymer chain to form a polymer containing segments representable as

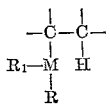

where $R_1$ is hydrogen or R as defined above. The addition of sulfur dioxide forms organometal sulfinate structures representable by

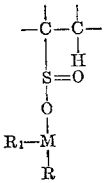

while the addition of carbon disulfide forms organometal dithiocarboxy structures representable by

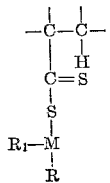

The addition of an acidifying agent converts the organometal sulfinite structures and organometal dithiocarboxy structures to sulfino groups representable by

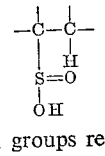

and dithiocarboxy acid groups representable by

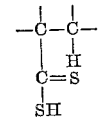

respectively.

The products of the invention can vary from liquids to rubber, depending upon the parent polymer. The products have utility as adhesives, putties, ion exchange resins, and novelty rubbers. The acidic groups serve as points of attack by various reagents with which they will react to produce coupling and crosslinking reactions.

The following examples are presented in further illustration of the invention and should not be construed to unduly limit the invention.

Example 1

Runs were conducted for the polymerization of 1,3-butadiene in the presence of n-butyllithium as the catalyst. The following recipe was used:

| | Parts by weight |
|---|---|
| 1,3-butadiene (1.85 moles) | 100 |
| Cyclohexane | 1000 |
| n-Butyllithium (4.0 mhm.) | 0.26 |
| Temperature, ° F. | 122 |
| Time, hours | 18 |

Mhm.=millimoles per 100 grams monomer.

Conversion in each run was essentially quantitative. At the close of the polymerization period, variable amounts of diisobutylaluminum hydride were added to the reaction mixtures which were then heated six hours at 122° F. An excess of sulfur dioxide was introduced and the mixtures were agitated for about five minutes. A control run was made in which the diisobutylaluminum hydride treatment was omitted but otherwise the procedure was the same as in the other runs. An antioxidant solution of 2,2′-methylenebis(4-methyl-6-tert-butylphenol) in a mixture of equal volumes of isopropyl alcohol and toluene was blended with each polymer solution in an amount sufficient to provide approximately one part by weight of the antioxidant per 100 parts by weight of the polymer. The aluminum salt groups in the polymer were converted to sulfino

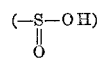

groups by treatment with an excess of an alcoholic solution of hydrochloric acid, prepared by mixing concentrated hydrochloric acid with isopropyl alcohol in a 1/9 volume ratio. This treatment also served to maintain fluidity of the mixture. The products were recovered by coagulation in isopropyl alcohol after which they were separated and dried.

Polymer acidity, i.e., presence of sulfino

groups, was determined by dissolving samples of the polymer in pyridine and titrating with sodium methylate using thymol blue as the indicator. The sodium methylate was dissolved in a mixture of benzene and methanol. Data on the several runs are presented in Table I.

TABLE I

| Run No. | DBAH, mhr | Mmoles DBAN/mole Bd | Acidity, mhr. |
|---|---|---|---|
| 1 | 5 | 2.7/1 | 1.2 |
| 2 | 10 | 5.4/1 | 2.0 |
| 3 | 15 | 8.1/1 | 2.9 |
| 4 | 20 | 10.8/1 | 5.7 |
| 5 | 0 | | 0.2 |

DBAH=diisobutylaluminum hydride.
mhr.=millimoles per 100 grams rubber.
Bd=butadiene.

The data show that the acidity increased as the amount of diisobutylaluminum hydride increased. There was a small amount of titratable material in control run 5. The acidity in the other runs was essentially that contributed by —SO₂H groups.

Example II

The following recipe was employed for the copolymerization of butadiene with styrene:

| | Parts by weight |
|---|---|
| 1,3-butadiene (0.93 mole) | 50 |
| Styrene | 50 |
| Cyclohexane | 1000 |
| tert-butyllithium (4.0 mhm.) | 0.26 |
| Temperature, °F. | 122 |
| Time, hours | 4 |

The procedure was essentially that described in Example I except that the reaction mixtures were heated 16 hours at 122° F. after addition of the diisobutylaluminum hydride. Data are presented in Table II.

TABLE II

| Run No. | DBAH, mhm. | Mmoles DBAH, mhr. | Acidity, mhr. | Inh. Visc. | Gel, percent |
|---|---|---|---|---|---|
| 1 | 2 | 4.0 | 1.3 | 0.57 | 0 |
| 2 | 5 | 10.0 | 1.4 | 0.58 | 0 |
| 3 | 10 | 20.0 | 2.8 | 0.65 | 0 |
| 4 | 20 | 40.0 | 8.7 | p.69 | 0 |
| 5 | 30 | 60.0 | 25.2 | 0.48 | 0 |
| 6 | 0 | | 0.4 | 0.61 | 0 |

These data again demonstrate that the acidity increased as the diisobutylaluminum hydride increased. A small amount of titratable material was present in the control run. The acidity in runs 1 through 6 was contributed primarily by the —SO$_2$H groups in the polymer. The data show very little, if any, increase in inherent viscosity as a result of the treatment with diisobutylaluminum hydride and sulfur dioxide, even though there was a substantial variation in acid content as the amount of diisobutylaluminum hydride increased, thus indicating that the reaction occurred along the polymer chain.

Example III

The procedure of Example I was followed except that carbon disulfide was used instead of SO$_2$ following the reaction of diisobutylaluminum hydride with polybutadiene. Results were as follows:

| Run No. | DBAH, mhr. | Acidity, mhr. |
|---|---|---|
| 1 | 5 | 0.6 |
| 2 | 10 | 0.7 |
| 3 | 15 | 0.9 |
| 4 | 20 | 1.1 |

The data show that the acidity increased as the amount of diisobutylaluminum hydride increased.

Reasonable variation and modification are possible within the scope of the foregoing disclosure, the drawings and the appended claims to the invention.

What is claimed is:

1. A method for producing a polymer containing acidic groups which comprises contacting a polymer containing aliphatic double bonds in the polymer chain with an organometal hydride represented by the formula R$_x$MH$_y$ where R is selected from the group consisting of saturated aliphatic, saturated cycloaliphatic, and aromatic radicals and combinations thereof, containing from 1 to 20 carbon atoms per molecule, M is a metal selected from the group consisting of aluminum, gallium, indium and thallium, H is hydrogen, $x$ and $y$ are integers selected from the group consisting of 1 and 2 and the sum of $x$ and $y$ equals the valence of the metal; contacting the resulting reaction mixture with a treating agent selected from the group consisting of sulfur dioxide and carbon disulfide; adding an acidifying agent to the thus treated reaction mixture; and recovering an acidic polymeric material containing acidic groups selected from the class consisting of —SOOH and —CSSH.

2. A method in accordance with claim 1 wherein said polymer is selected from the group consisting of homopolymers of monomers selected from the group consisting of acyclic alkadienes, acyclic alkatrienes, cyclic alkadienes and cyclic alkatrienes, copolymers of at least two of said monomers, and copolymers of at least one of said monomers with at least one mono-1-olefin.

3. A method in accordance with claim 1 wherein said organometal hydride is present in an amount in the range of 1 to 200 millimoles per 100 grams of said polymer.

4. A method in accordance with claim 1 wherein said polymer is contacted with said organometal hydride at a temperature in the range of 40° F. to 300° F.

5. A method in accordance with claim 1 wherein said polymer is a polymer of butadiene.

6. A method in accordance with claim 1 wherein said polymer is polybutadiene.

7. A method in accordance with claim 1 wherein said polymer is a copolymer of butadiene and styrene.

8. A method in accordance with claim 1 wherein said organometal hydride is diisobutylaluminum hydride.

9. A method in accordance with claim 1 wherein said treating agent is carbon disulfide.

10. A method in accordance with claim 1 wherein said treating agent is sulfur dioxide.

11. A method of preparing a polymer containing acidic groups which comprises contacting a polymer of butadiene with diisobutylaluminum in an amount in the range of 1 to 200 millimoles per 100 grams of polymer at a temperature in the range of 75° F. to 200° F., adding to the resulting reaction mixture a treating agent selected from the group consisting of sulfur dioxide and carbon disulfide, contacting the thus treated reaction mixture with hydrochloric acid, and recovering the resulting polymeric material containing acidic groups selected from the class consisting of —SOOH and —CSSH.

12. A method in accordance with claim 11 wherein said polymer is polybutadiene.

13. A method in accordance with claim 11 wherein said polymer is a copolymer of butadiene and styrene.

14. A method for producing a polymer containing acidic groups which comprises contacting at a temperature in the range of 75° F. to 200° F. a polymeric material selected from the group consisting of (1) homopolymers of monomers selected from the group consisting of acyclic alkadienes, acyclic alkatrienes, cyclic alkadienes and cyclic alkatrienes, (2) copolymers of at least two of said monomers, and (3) copolymers of at least one of said monomers with at least one mono-1-olefin, with from 1 to 200 millimoles per 100 grams of said polymeric material of an organometal hydride represented by the formula R$_x$MH$_y$ where R is selected from the group consisting of saturated aliphatic, saturated cycloaliphatic, and aromatic radicals and combinations thereof, containing from 1 to 20 carbon atoms per molecule, M is a metal selected from the group consisting of aluminum, gallium, indium and thallium, H is hydrogen, $x$ and $y$ are integers selected from the group consisting of 1 and 2 and the sum of $x$ and $y$ equals the valence of the metal; contacting the resulting reaction mixture with an excess with respect to said organometal hydride of a treating agent selected from the group consisting of sulfur dioxide and carbon disulfide; adding to the thus treated reaction mixture an acidifying agent selected from the group consisting of mineral acids and organic acids, and recovering from the thus acidified reaction mixture a polymer containing acidic groups selected from the class consisting of —SOOH and —CSSH along the polymer chain.

References Cited

UNITED STATES PATENTS 3,168,456  2/1965  Furrow _____ 204—159.22

JOSEPH L. SCHOFER, *Primary Examiner.*

D. K. DENENBERG, *Assistant Examiner.*